United States Patent [19]

Camisa

[11] Patent Number: 4,483,227

[45] Date of Patent: Nov. 20, 1984

[54] CORNER SHEARS

[75] Inventor: Alessandro Camisa, Felegara, Italy

[73] Assignee: F.I.M. s.r.l., Italy

[21] Appl. No.: 393,042

[22] Filed: Jun. 28, 1982

[30] Foreign Application Priority Data

Jan. 13, 1982 [DE] Fed. Rep. of Germany ... 8200527[U]

[51] Int. Cl.$^3$ ............................................. B23D 15/08
[52] U.S. Cl. ....................................... 83/559; 83/581;
83/693; 83/620; 83/917; 144/217
[58] Field of Search ................. 83/620, 559, 581, 693,
83/917; 144/217

[56] References Cited

U.S. PATENT DOCUMENTS

| 69,510 | 10/1867 | Tompkins | 144/217 |
|---|---|---|---|
| 81,373 | 8/1868 | Howard | 144/217 |
| 83,891 | 11/1868 | Tompkins et al. | 144/217 |
| 3,958,482 | 5/1976 | Claesson | 83/559 |

Primary Examiner—Donald R. Schran
Attorney, Agent, or Firm—Wigman & Cohen

[57] ABSTRACT

The invention relates to corner shears for cutting out obtuse-angled to acute-angled corners from sheet metal by means of upper and lower knives (41, 40) which interact with one another in the manner of scissors and which, to form an angular cutting edge, each consists of two knives placed against one another in a V-shaped manner and supported on knife carriers (52, 53, 19,20) pivotable about a vertical axis A, the pivot axis (A) passing respectively through the cutting corner and means being provided for adjusting the angle α between the cutting edges, each upper-knife carrier (52, 53) being connected positively, without the shear stroke being impeded, to the corresponding lower-knife carrier (19, 20) via an engagement piece (72) fastened to the upper-knife or lower-knife carrier.

20 Claims, 6 Drawing Figures

CORNER SHEARS

The invention relates to corner shears for cutting out obtuse-angled to acute-angled corners from sheet metal by means of knives, the cutting angle of which is variable.

Corner shears of this type are known from German Utility Model No. 7,605,483. This device has a pair of C-shaped vertically arranged columns, horizontal portions of which are articulated to one another along a vertical axis. Knives are fastened in the region of the recess between the upper and lower portions, so that, when the columns are pivoted, they also are pivoted about the vertical axis. At the same time, the angle both between the upper and between the lower pair of knives changes. A disadvantage of these known corner shears is that the forces arising during cutting have to be absorbed by the columns, the structural shape of which has to be correspondingly sturdy and elaborate so as to prevent the scissor-like interaction between the upper and lower knives during cutting from being impaired because the cutting edges spread apart from one another as a result of widening of the C-shaped columns.

The object of the invention is to provide corner shears with knives of variable cutting angle, which have a simple construction and which guarantee that the cutting forces are absorbed by various bearing elements.

This object is achieved by means of the features of the claims. The invention is explained in more detail by way of example with reference to the drawing in which:

The corner shears are appropriately mounted in a machine stand 1 which resembles a box frame and which has essentially the two sides walls 2 and 3 with appropriate cross-struts to guarantee the necessary stability of the box frame. Seen from the side, the side walls 2 and 3 can be made L-shaped, and the cutting or work table 5 is mounted in a suitable way (not shown) on the horizontal L-legs 4. A front wall 7 between the L-legs 4 closes the apparatus under the work table 5. Grooves 8 known per se with angle-adjusting devices 9 are arranged on the work table.

Figure 2:
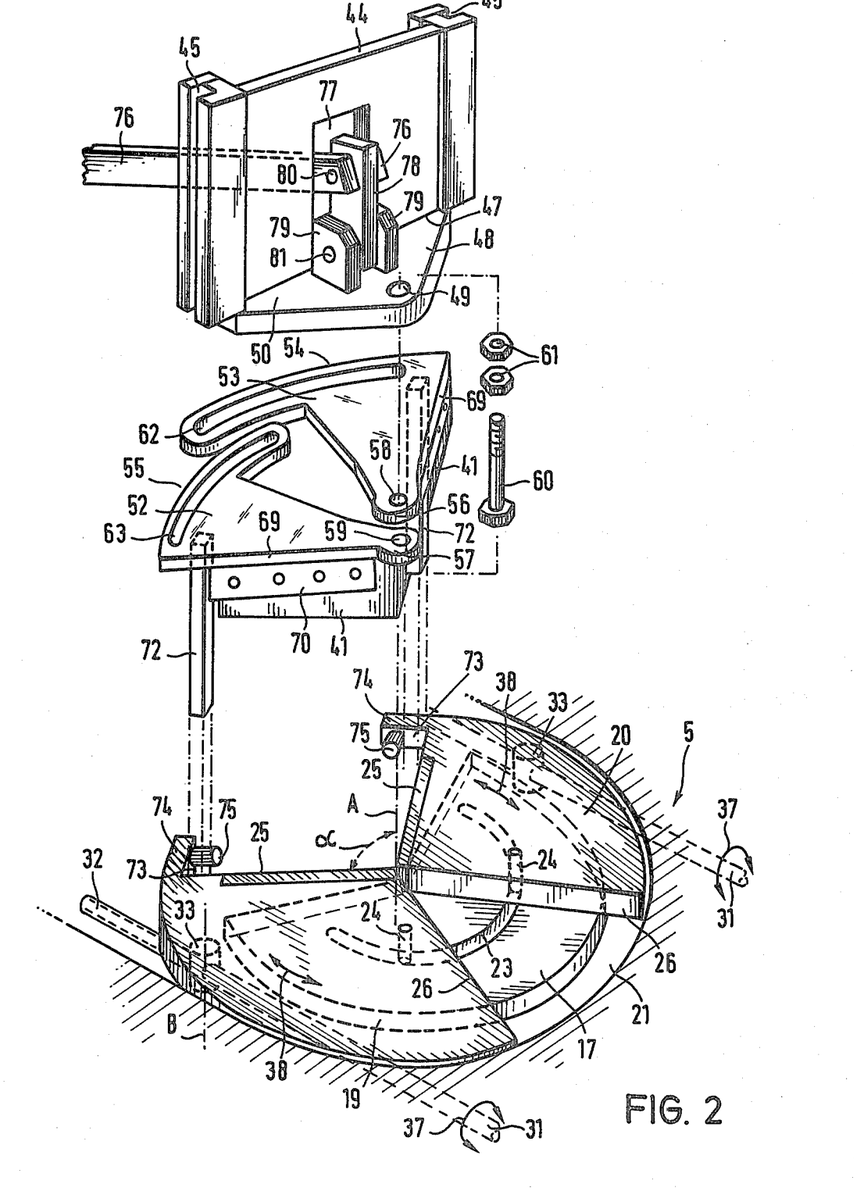
FIG. 2 shows an exploded representation of the arrangement of the upper knives.
Figure 3:
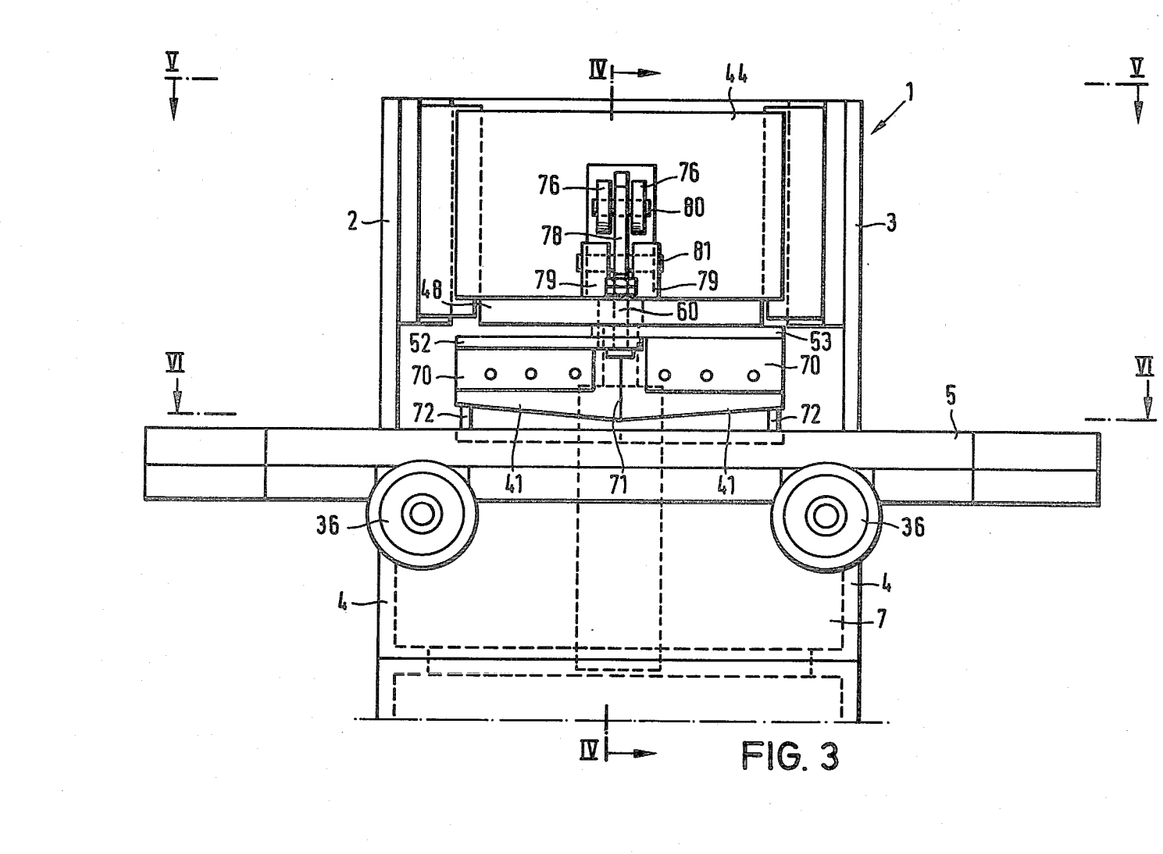
FIG. 3 shows a front view according to the direction of the arrow III in FIG. 1.

The work table 5 has a recess 10 with a circular arc; the latter is located at a distance from the front edge 11 and centrally at a distance from the side walls 12 of the work table 5, the recess 10 opening out towards the rear edge 13 parallel to the side walls 12, so that, seen from above, the work table 5 is made U-shaped. The center point of the circular arc of the recess 10 is located on the axis A (FIG. 2). According to the invention, the angularly adjustable lower-knife device 6 is located in the region of the recess 10.

Figure 4:
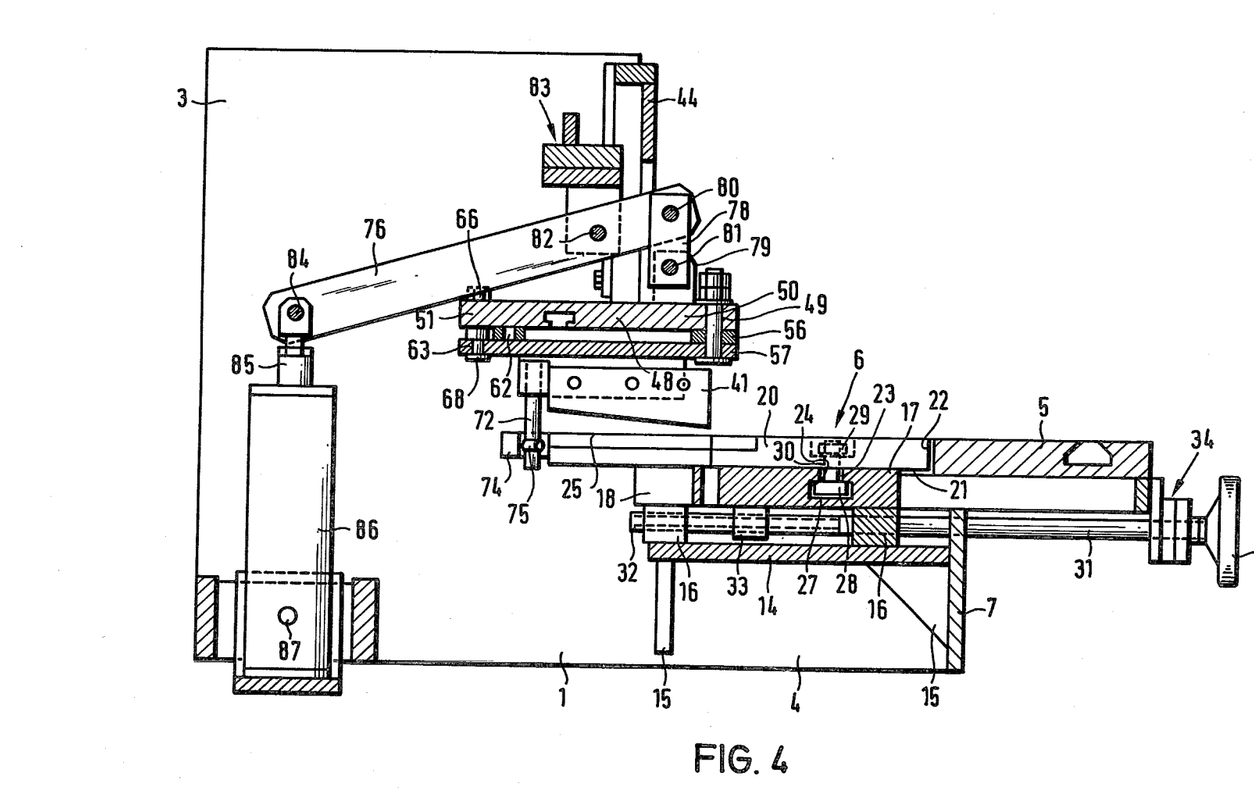
FIG. 4 shows a section through the corner shears along the line IV—IV according to the direction of the arrow in FIG. 3.

The lower-knife device 6 is supported by a support plate 14 which rests horizontally at a distance underneath the work table 5 between the L-legs 4, is fastened to the latter and to the front wall 7 and appropriately also rests on triangular angle irons 15 which, as shown, are arranged on the L-legs 4 and on the front wall 7 (FIG. 4). At least three support blocks 16 rest on the support plate and are distributed in such a way that they are located at the corner points of a triangle, the apex of the triangle pointing towards the front wall 7. These blocks 16 constitute a statically determined support for a circular disk 17 which has a V-shaped cut-out and the cut-out 18 of which is located to the rear, the corner of the V-shaped cut-out 18 preferably not being in the center axis of the circular disk 17, but the center axis lying in the axis A. The radius of the circular disk 17 is less than the radius of the arc of the recess 10, so that an annular gap 21 is left free.

Two disk-shaped knife carrier segments 19, 20 arranged opposite one another are mounted, so as to be pivotable in the horizontal plane about the center axis A, on the circular disk 17 and, seen from above, are designed as angular segments of a sector of a circle, the vertex edges being located opposite one another in the region of the center axis A (FIG. 2) and the radius of the segments being only slightly less than the radius of the arc of the recess 10, so that the arc edges 22 of the segments 19, 20 rest virtually positively in the arc of the recess 10.

According to the invention, the segments of a sector of a circle 19,20 are arranged so as to be pivotable about the axis A in a horizontal plane, the surface of the segments being aligned in a horizontal plane with the surface of the work table 5. It is appropriate, for the pivotable mounting of the segments on the circular disk 17, to provide a groove 23 in the form of a circular arc when seen from above and to place the center point of the circular arc of the groove in the axis A. A pin 24 projecting vertically downwards from each of the segments 19,20 engages positively into the groove 23 because its diameter or width corresponds to the width of the groove, so that each pin can slide in the groove. This arrangement guarantees by simple means that the segments 19, 20 can be pivoted in a circular arc on the circular disk 17 in a horizontal plane without lateral displacement, the angle α0 between the rear edges 25 of the segments being varied within the predetermined limits (the length of the groove 23 and the butting of the front edges 26 of the segments against one another). The segments 19, 20 can be retained on the circular disk 17 in a suitable way after the angle α has been adjusted; this retention is preferably guaranteed by hydraulic means which effect hydraulic locking.

According to a special embodiment of the invention, the cross-section of the groove 23 takes the form of an upturned T, the transverse recess 27 forming the bottom of the groove. The pin 24 is correspondingly provided with a head 28 which rests positively in the transverse recess 27. Preferably, the pin 24 passes through a bore 30 in the segment 19, 20 and has a thread, so that it is fastened releasably to a nut 29 countersunk in an appropriate recess in the segment 19, 20, and the circular disk 17 can be braced with the particular segment 19, 20. To change the angle α, the nuts 29 are slackened, the segments 19, 20 are pivoted and the nuts 29 are subsequently retightened.

To simplify the pivoting action and to control the pivoting angle, an approximately horizontally extending spindle 31 is appropriately provided for each segment 19, 20. Each spindle 31 carries at the rear end an external thread 32 guided in a corresponding internal thread of a bearing journal 33 which is arranged rotatably about a vertical axis B on each segment 19, 20 on the underside in the region of the outer margin and in the vicinity of the edge 25 (FIG. 2). The bearing journals 33 appropriately project into the annular gap 21 and are guided there on a circular track.

Each spindle 31 passes freely through a hole in the front wall 7 and engages through a pivot bearing 35 which corresponds to the pivot bearing 33 and which is fastened to a bearing block 34 resting on the front edge of the work table 5. A bevel wheel 36 for rotating the spindle in the direction of the arrow 37 (FIG. 2) rests, as known per se, on the front end of each spindle. When the spindles are rotated in the direction of the arrows 37, the segments 19, 20 are pivoted about the vertical axis A in the direction of the arrow 38 (FIG. 2), the lateral displacement and the forward and backward movement of the spindles being absorbed by the pivot bearings 33, 35.

Figure 6:
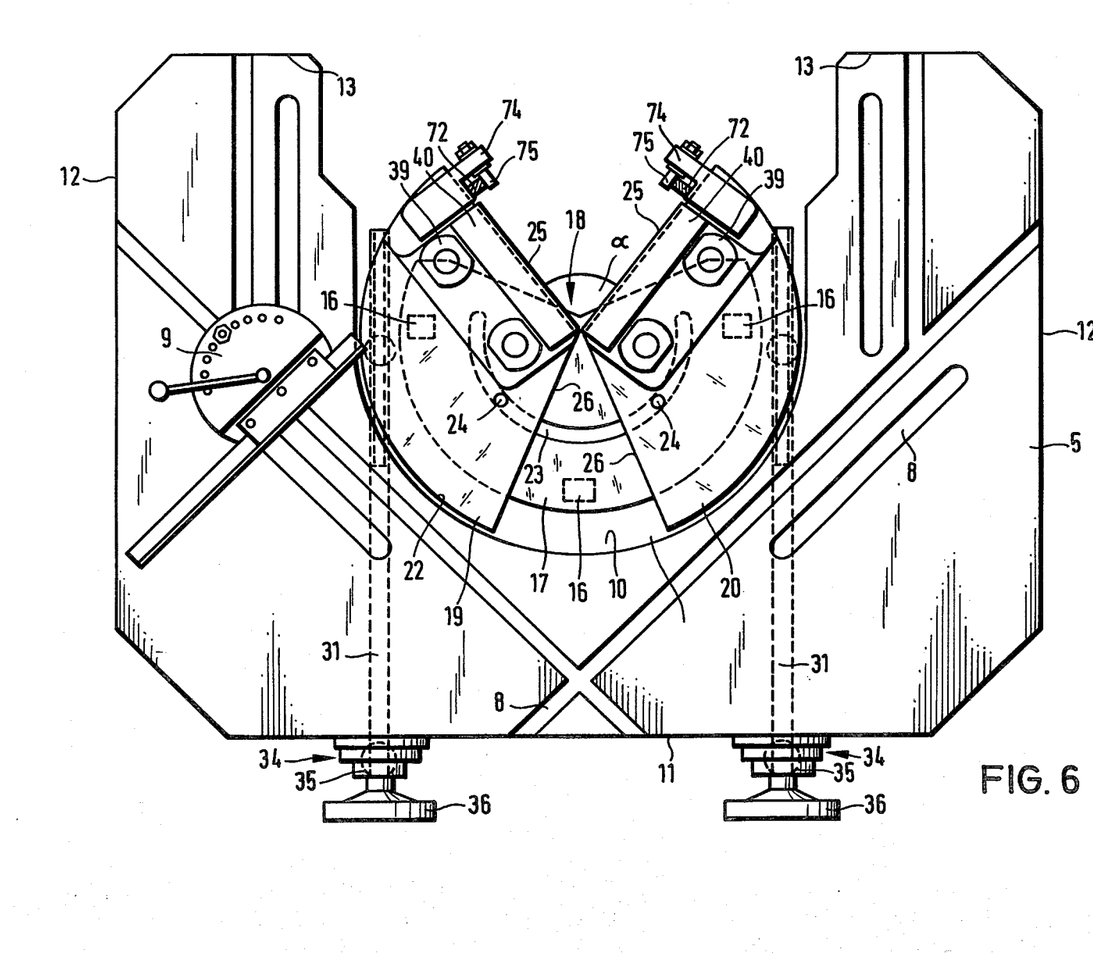
FIG. 6 shows a plan view of the arrangement of the lower knives according to the direction of the arrow VI in FIG. 3.

The rear edges 25 of the segments constitute the cutting edges of the lower knives which, as is conventional, are arranged in a V-shaped manner relative to one another. As is customary, retaining means 39 and recesses can be provided in the region of the segment edges 25 for inserting exchangeable lower knives 40 (FIG. 6).

It is essential that the upper knives be mounted likewise pivotably about the vertical axis A, but in separate bearing elements independent of the bearing elements of the lower knives, and that they also be pivoted as result of the movement of the segments 19, 20 via dogs which make contact which is rigid laterally but sliding in a vertical direction between the segments 19, 20 and the bearing elements of the upper knives.

Whereas the two lower knives 40 arranged in a V-shaped manner relative to one another when seen from above are mounted fixedly in a vertical direction, a vertical lifting movement for shearing is executed by the upper knives 41, the cutting edges of which are likewise arranged, as is customary, in a V-shaped manner relative to one another. Thus, the cutting edges of the upper knives slide past the cutting edges of the lower knives in the manner of shears and effect the shear cut. It is necessary for this reason that the edge angle of the cutting edges of the upper knives be equal to the corner angle $\alpha$ of the cutting edges of the lower knives. To guarantee this conformity, the arrangement of the upper knives is as follows.

In the front end region of the walls 2, 3, rail-like slideway elements 42 are arranged in a vertical direction on the inside. In the example illustrated, the elements 42 each consist of a web 43. Inserted between the webs 43 is a sliding plate 44 with sliding recesses 45 which are located laterally and are U-shaped when seen from above and which engage positively round the web 43, so that a slideway is obtained and the sliding plate 44 can be pushed up and down in the direction of the arrow 46.

Figure 1:
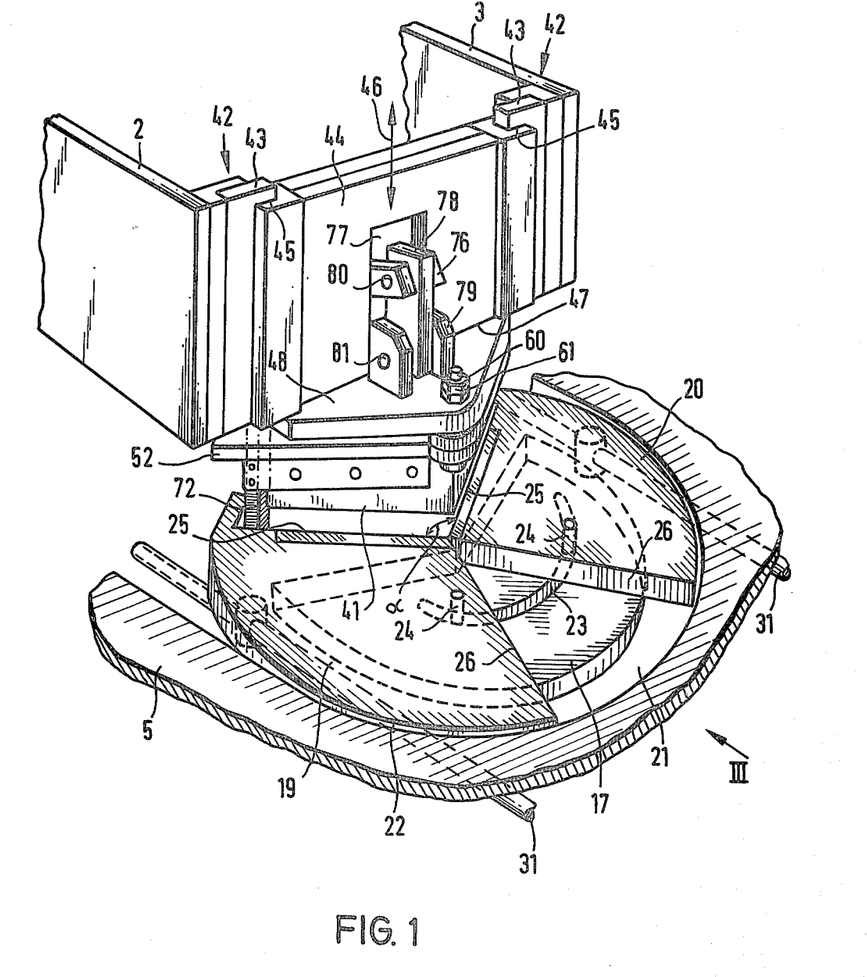
FIG. 1 shows diagrammatically a perspective view of the new corner shears with the most important functional parts.
Figure 5:
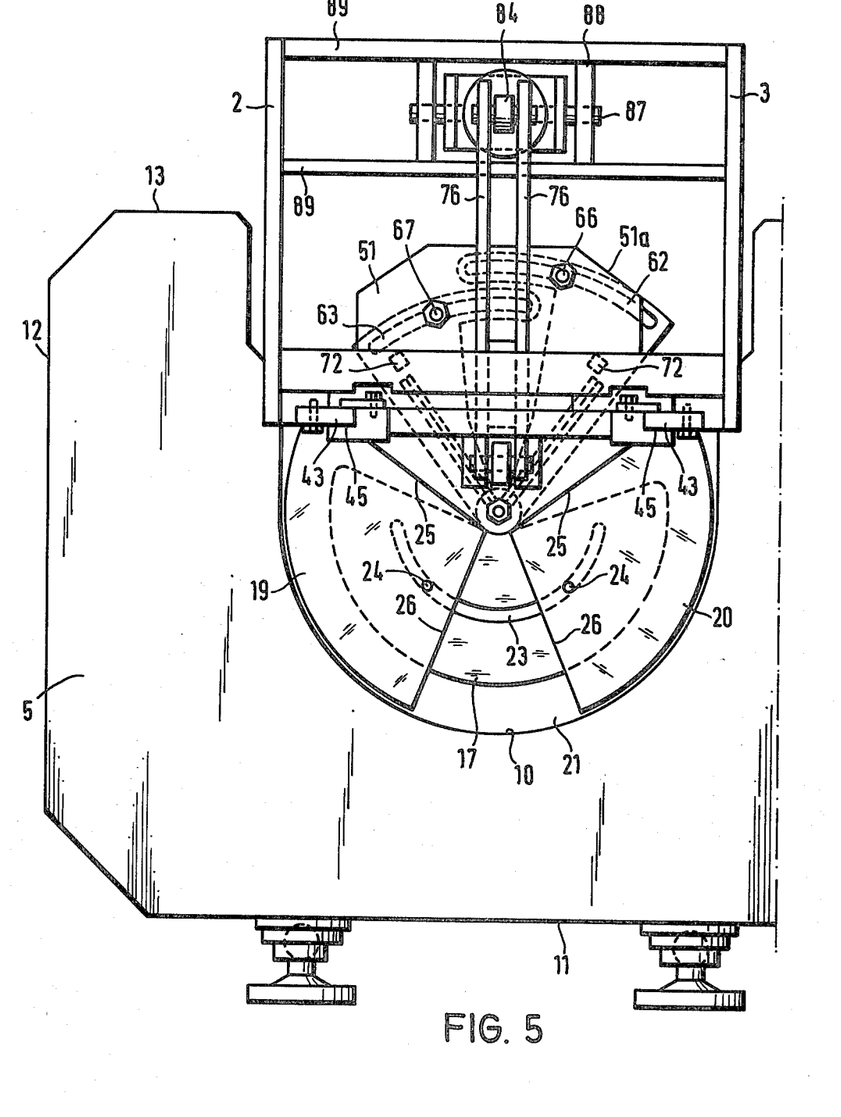
FIG. 5 shows a plan view of the corner shears according to the direction of arrow V in FIG. 3.

Fastened to the lower edge 47 of the sliding plate 44 is a horizontally arranged support plate 48 which projects beyond the sliding plate to the front and to the rear. In the front projecting region 50 the support plate 48 is made triangular when seen from above (FIGS. 1, 2 and 5), the apex of the triangle pointing towards the axis A. A hole 49 is made in an axial direction in the region of the axis A. The rear projecting region 51 of the support plate 48 can be made rectangular when seen from above or can have bevelled edges 50a.

The upper-knife carriers 52 and 53 are arranged pivotably in a horizontal plane underneath the fixed support plate 48. For this purpose, the knife carriers 52, 53 are made essentially in the form of circular sectors when seen from above, the circular arcs 54, 55 being located at the rear and the rounded segment-apex regions 56, 57 being located at the front. Fashioned in the apex regions 56, 57 are vertical holes 58, 59 which are aligned with the hole 49 in the support plate 48 and through which engages a pivot pin 60 which coincides with the axis A and which retains the knife carriers 52 and 53 pivotably under the support plate 48. For example, as shown in FIG. 2, the pivot pin 60 can consist of a hexagon-head screw engaging through the holes 59, 58 and 49, nuts 61 being screwed onto the thread of the screw so that the vertical fastening of the knife carriers is guaranteed.

The knife carrier 53 is appropriately located above the knife carrier 52, so that they can slide past against one another for the purpose of pivoting. The arrangement can, of course, also be reversed. To assist the mounting on the pin 60, arcuate slots 62, 63 are made in the region of the arcs 54, 55. It is also ensured, appropriately, that the radius of the segment 52 is shorter than that of the segment 53 and that the segments have inwardly directed webs 64, 65 to prolong the slots 62, 63, the slots 62, 63 being arranged offset to the rear relative to one another when seen from above. Pegs 66, 67 pass through the slots, project downwards from the support plate 48, are fastened in or on the latter and appropriately have at the lower free end a head 68 which is wider than the width of the particular slot, so that the pegs can retain the segments 52, 53 and because of the length of the slots limit the pivoting movement of the knife carriers. The center point of the slot arcs is located in the axis A. In another embodiment of the invention, the slots 62, 63 are provided in the part 51 of the support plate 48 and the pegs 66, 67 are located correspondingly in the knife carriers 52, 53.

Fastened under the segments 52, 53 in the region of the outer edges 69 are retaining webs 70 which, as is conventional, carry the upper knives 41 which, in a way known per se, are chamfered to the rear when seen from above (not shown) at the edges 71 butting together, so that the edges 71 can remain together during the pivoting movement.

It is essential that there be arranged on each knife carrier 52, 53 an engagement element which is connected to the associated circular-disk segment 19, 20 of the lower knives so that the pivoting movement of the circular-disk segments 19, 20 is transmitted without slip to the upper-knife carriers 52, 53. In an appropriate embodiment of the invention, engagement bolts 72 projecting vertically downwards are fastened in the arc region to the free end of the edges 69. These bolts engage through a, for example, U-shaped recess 73 in the edge region of the particular circular-disk segment 19, 20. The recess 73 is preferably formed by a web 74 which projects at right angles from the rear edge 25 and on which is located a roller 75 directed horizontally inwards at right angles. According to the invention, a bolt 72 can slide positively up and down in this recess, so that the lifting movement of the arrangement of upper knives is not disturbed. By simple means of this type, the upper-knife carriers are driven when the lower-knife carriers are pivoted, without a connection rigid in a vertical direction existing between the upper-knife and lower-knife carriers.

The lifting drive of the upper-knife carriers can be as desired. It is expedient and simple, as illustrated, to provide two levers 76 which are arranged parallel next to one another and which at their front end engage through a cut-out portion 77 in the sliding plate 44 and support between them, so as to be rotatable about the axis 80, a connecting web 78 which rests rotatably about the axle 81 between two bearing blocks arranged next to one another on the triangular region 50 of the support plate 48. A further rotatable mounting of the levers 76 is provided at 82, the axle 82 being supported in the side walls 2, 3 or in support elements 83 connected thereto.

At the rear end, the levers 76 are connected rotatably at 84 to a piston rod 85 of a piston/cylinder unit 86 which is vertical and is supported at the base end likewise rotatably about the axle 87 in bearing blocks 88. The bearing blocks 88 are located vertically between two cross-struts 89 connecting the walls 2, 3 and are fastened to these. This drive of the upper-knife carriers is simple and space-saving.

I claim:

1. Corner shears for cutting out obtuse-angled to acute-angled corners from sheet metal by means of upper and lower knives which interact in the manner of scissors and which, to form an angular cutting edge, consist respectively of two knives placed against one another in a V-shaped manner and supported on knife carriers pivotable about a vertical axis, the pivot axis passing through the respective cutting corner, said upper-knife carriers being circular-sector segments arranged pivotally about a pivot pin coinciding with the vertical axis, and means being provided for adjusting the angle between the cutting edges, wherein each upper-knife carrier is connected positively, without the shear stroke being impeded, to the corresponding lower-knife carrier via an engagement piece fastened to the upper-knife or lower-knife carrier.

2. Corner shears as claimed in claim 1, wherein the engagement piece is a vertically aligned bolt which engages positively into a recess and which slides vertically freely in the recess during the shear stroke.

3. Corner shears as claimed in claim 1 or 2, wherein the lower-knife carriers consist of two identically designed and horizontally arranged circular-disk sector segments, the sector corners of which are placed against one another in the axis A and which are mounted pivotably about the axis A, their rearward sector edges constituting or supporting the lower knives.

4. Corner shears as claimed in claim 3, wherein the segments are arranged in the work table in a recess with a circular arc, the center point of which is located in the axis A, the surfaces of the segments being aligned with the surface of the work table and the radius of the segments being slightly less than the radius of the circular arc of the recess.

5. Corner shears as claimed in claim 3, wherein the segments rest on a horizontally arranged circular-sector disk which is supported in the machine frame and the radius of which is less than the radius of the circular arc of the recess, so as to form an annular gap, and the V-shaped sector cut-out of which is located at the rear, there being made in the disk, in the form of a circular arc, a groove or a gap, the circular-arc center point of which is located in the axis A, and a pin which is fastened to each of the segments and points vertically downwards and the width of which corresponds to the width of the groove, projects into the groove.

6. Corner shears as claimed in claim 5, wherein the cross-section of the groove is made T-shaped and the pin has a head which projects into the transverse recess of the groove, the pin engaging positively through a bore in the segment and carrying at its end a thread onto which is screwed a nut countersunk in a recess of the segment.

7. Corner shears as claimed in claim 6, wherein connected to each segment is a horizontally arranged spindle which, when rotated, causes the segment to pivot about the axis A.

8. Corner shears as claimed in claim 7, wherein the spindle carries at the rear end an external thread guided in a corresponding internal thread of a bearing journal which is arranged rotatably about a vertical axis B on the segment on the underside in the region of the outer margin and in the vicinity of the edge, the bearing journal projects into the annular gap, at the other end the spindle passes through a pivot bearing which corresponds to the pivot bearing and which rests pivotably on the front edge of the work table, and a wheel is located on the front end of the spindle.

9. Corner shears as claimed in claim 8, wherein the recess is formed by a web which projects at right angles from the rear edge of the segment and on which is located a roller which is directed horizontally inwards at right angles.

10. Corner shears as claimed in claim 9, wherein the circular-sector segments of the knife carriers have circular arcs located at the rear and rounded segment apices located at the front, and fashioned in the apices are vertical holes which are aligned with the hole in a support plate located above the knife carriers, the pivot pin being designed as a bolt which retains the knife carriers pivotably under the support plate.

11. Corner shears as claimed in claim 10, wherein the knife carrier is located above the knife carrier, and arcuate slots are made in the region of the arcs, the segment being made shorter than the segment and the segments having inwardly directed webs to prolong the slots, and pegs pass through the slots which pegs are fastened in the support plate and project vertically downwards from the latter, the pegs having a head which is wider than the width of the particular slot, the center point of the circular arc of the slots being located in the axis A.

12. Corner shears as claimed in claim 11, wherein fastened under the segments in the region of the outer edges are retaining webs carrying the upper knives which, in a way known per se, are chamfered starting from the edges butting together.

13. Corner shears as claimed in claim 12, wherein fastened in the arc region on the free end of the edges are engagement bolts which project vertically downwards and engage through the U-shaped recess in the edge region of the associated circular-sector disks segment and which can project into the annular gap.

14. Corner shears as claimed in claim 13, wherein the support plate is fastened to a vertically aligned sliding plate guided laterally in slideway elements which are supported in the front end region of the walls of the machine frame.

15. Corner shears as claimed in claim 14, wherein the support plate and/or the sliding plate are connected to a lifting device.

16. Corner shears as claimed in claim 15, wherein the lifting drive has two levers which are arranged parallel next to one another and at the front end engage through a cut-out portion of the sliding plate and which support between them, so as to be rotatable about the axis, a connecting web which rests rotatably about the axle between two bearing blocks arranged next to one another on the triangular region of the support plate, a further rotatable mounting of the levers being provided at and the axle being supported in the side walls, and at the rear end the levers are connected rotatably at to a piston rod of a piston/cylinder unit which is vertical and is supported at the base end likewise rotatably about an axle in bearing blocks located vertically between two cross-struts connecting the walls.

17. Corner shears for cutting out corners from sheet material, comprising:

two upper knife blades arranged in a V-shaped manner and supported by two upper knife blade carriers, both carriers pivotally mounted on one pin, wherein the angle between said upper knife blades can be adjusted by pivoting the upper knife blade carriers about the pin;

two lower knife blades arranged in opposing fashion to said upper knife blades in a V-shaped manner on pivotable lower knife blade carriers, wherein the angle of said lower blades can be adjusted; and connection means operatively connecting said upper and lower knife blade carriers such that when the angle between one of the sets of knife blades is adjusted, the angle between the other set of knife blades is correspondingly adjusted;

means connected to said upper and lower blade carriers for bringing said upper and lower knife blades together, whereby said blades interact in a scissor-like manner for cutting corners out of sheet material.

18. The shears according to claim 17, wherein the pin extends along the axis upon which said blades pivot.

19. The shears according to claim 18 wherein the length of the cutting edges of said knife blades is longer than the height of said blades.

20. The shears according to claim 19, further comprising at least one threaded spindle and means for adjusting the angle of said knife blades in response to rotation of said spindle.

* * * * *